(12) United States Patent
Chittoor

(10) Patent No.: US 12,276,098 B1
(45) Date of Patent: Apr. 15, 2025

(54) SYSTEM FOR PURIFYING AND DELIVERING SURFACE WATER TO AN AQUIFER

(71) Applicant: Madhvi Chittoor, Arvada, CO (US)

(72) Inventor: Madhvi Chittoor, Arvada, CO (US)

( * ) Notice: Subject to any disclaimer, the term of this patent is extended or adjusted under 35 U.S.C. 154(b) by 384 days.

(21) Appl. No.: 17/950,050

(22) Filed: Sep. 21, 2022

(51) Int. Cl.
| E03F 1/00 | (2006.01) |
| C02F 1/00 | (2023.01) |
| C02F 103/00 | (2006.01) |
| E03F 5/04 | (2006.01) |

(52) U.S. Cl.
CPC .............. *E03F 1/002* (2013.01); *C02F 1/001* (2013.01); *E03F 5/0404* (2013.01); *C02F 2103/001* (2013.01)

(58) Field of Classification Search
None
See application file for complete search history.

(56) References Cited

U.S. PATENT DOCUMENTS

| 528,888 | A | * | 11/1894 | Mcgill | E02B 11/005 210/166 |
| 746,949 | A | * | 12/1903 | Gardner | A23L 7/13 210/497.3 |
| 919,200 | A | * | 4/1909 | Menton et al. | E03F 1/002 210/542 |
| 1,129,324 | A | * | 2/1915 | Appelman | E02B 11/005 405/47 |
| 1,204,462 | A | * | 11/1916 | Lawrence | A61M 1/1666 4/300 |
| 1,536,000 | A | * | 4/1925 | Hawkins | E03F 1/002 210/170.08 |
| 2,482,870 | A | * | 9/1949 | Price | E03F 1/002 210/497.01 |
| 2,595,923 | A | * | 5/1952 | Carlson | E03F 1/002 52/270 |
| 2,711,223 | A | * | 6/1955 | Temple | E03F 1/002 210/170.03 |
| 2,767,801 | A | * | 10/1956 | Eads | C02F 3/046 405/36 |
| 2,796,176 | A | * | 6/1957 | Monson | E03F 5/18 210/261 |
| 3,057,796 | A | * | 10/1962 | Davis | C02F 3/046 210/207 |
| 3,060,693 | A | * | 10/1962 | Taylor | E03F 1/002 210/170.03 |
| 3,240,343 | A | * | 3/1966 | Werner | E03F 5/18 D25/36 |

(Continued)

FOREIGN PATENT DOCUMENTS

| WO | WO-2004022864 A1 | * | 3/2004 | E03F 1/00 |
| WO | WO-2023192580 A2 | * | 10/2023 | C02F 1/008 |

OTHER PUBLICATIONS

Activated Carbon, Wikipedia, 22 pages (Year: 2025).*

(Continued)

*Primary Examiner* — Robert J Popovics

(57) ABSTRACT

A system for purifying and delivering surface water from rain or snow-melt to the local aquifer in order to increase the local groundwater level, is disclosed. The system includes activated charcoal for removal of contaminants including per- and polyfluoroalkyl substances, commonly referred to as PFAS, from surface water prior to delivering the water to the aquifer.

12 Claims, 1 Drawing Sheet

(56) References Cited

U.S. PATENT DOCUMENTS

| | | | | | |
|---|---|---|---|---|---|
| 3,451,553 | A | * | 6/1969 | Cloyd | C02F 3/046 210/207 |
| 3,501,007 | A | * | 3/1970 | Cloyd | C02F 3/046 210/207 |
| 3,784,012 | A | * | 1/1974 | Carlson | E03F 11/00 210/170.08 |
| 3,817,864 | A | * | 6/1974 | Carlson et al. | C02F 3/28 210/170.08 |
| 3,837,168 | A | * | 9/1974 | Alsberg | E03F 1/002 405/50 |
| 4,031,009 | A | * | 6/1977 | Hicks | E03F 1/002 210/170.03 |
| 4,199,272 | A | * | 4/1980 | Lacey | E21B 37/08 172/26 |
| 4,589,798 | A | * | 5/1986 | Milly | B01D 24/04 405/36 |
| 4,689,145 | A | * | 8/1987 | Mathews | B01D 29/56 210/260 |
| 4,720,209 | A | * | 1/1988 | Iams | E03F 1/002 405/36 |
| 4,923,330 | A | * | 5/1990 | DeTommaso | E03F 1/002 405/36 |
| 4,982,533 | A | * | 1/1991 | Florence | E03F 1/005 52/16 |
| 4,983,069 | A | * | 1/1991 | Florence | E03F 1/005 405/36 |
| 5,086,594 | A | * | 2/1992 | Florence | E03F 1/002 52/16 |
| 5,131,196 | A | * | 7/1992 | Florence | E03F 1/002 52/16 |
| 5,195,284 | A | * | 3/1993 | Florence | E03F 1/002 52/16 |
| 5,249,885 | A | * | 10/1993 | Florence | E03F 1/002 405/38 |
| D350,815 | S | * | 9/1994 | Florence | D23/260 |
| 5,492,434 | A | * | 2/1996 | Adams | A01G 25/00 47/1.01 R |
| 5,511,904 | A | * | 4/1996 | Van Egmond | E03F 1/002 405/36 |
| 5,595,458 | A | * | 1/1997 | Grabhorn | E02B 3/125 210/170.03 |
| 5,650,065 | A | * | 7/1997 | Sewell | E03F 5/16 52/12 |
| 5,707,527 | A | * | 1/1998 | Knutson | C02F 1/283 210/170.03 |
| 5,714,077 | A | * | 2/1998 | Brown | B01D 24/46 210/275 |
| 5,810,510 | A | * | 9/1998 | Urriola | E02B 11/005 210/170.03 |
| 5,829,192 | A | * | 11/1998 | Gatliff | C22B 3/18 47/32.7 |
| 5,980,740 | A | * | 11/1999 | Harms | E03F 5/14 210/170.03 |
| 5,989,416 | A | * | 11/1999 | Gorton | C02F 3/04 210/197 |
| 5,993,649 | A | * | 11/1999 | DeBusk | C02F 3/32 210/170.03 |
| 5,997,735 | A | * | 12/1999 | Gorton | C02F 9/00 210/197 |
| 6,027,639 | A | * | 2/2000 | Lenhart, Jr. | C02F 1/283 210/170.03 |
| 6,080,308 | A | * | 6/2000 | Williamsson | E03F 1/00 210/170.03 |
| 6,083,402 | A | * | 7/2000 | Butler | E03F 5/0401 210/170.03 |
| 6,099,723 | A | * | 8/2000 | Morris | E03F 1/00 210/170.03 |
| 6,221,243 | B1 | * | 4/2001 | Flanagan | B01D 17/0202 210/170.03 |
| 6,251,269 | B1 | * | 6/2001 | Johnson | B01D 17/10 210/170.07 |
| 6,270,661 | B1 | * | 8/2001 | Jowett | C02F 3/046 210/903 |
| 6,270,663 | B1 | * | 8/2001 | Happel | B01D 35/22 210/170.03 |
| 6,277,274 | B1 | * | 8/2001 | Coffman | B01D 24/205 210/170.03 |
| 6,337,025 | B1 | * | 1/2002 | Clemenson | B01J 39/24 210/170.03 |
| 6,338,595 | B1 | * | 1/2002 | Schollen | E03F 5/14 210/170.03 |
| 6,467,994 | B1 | * | 10/2002 | Ankeny | A01G 25/06 210/170.03 |
| 6,485,639 | B1 | * | 11/2002 | Gannon | B01J 20/261 210/170.03 |
| 6,569,321 | B2 | * | 5/2003 | Coffman | E03F 1/002 210/170.03 |
| 6,616,834 | B2 | * | 9/2003 | Anderson | B01D 21/0024 210/162 |
| 6,793,811 | B1 | * | 9/2004 | Fleischmann | E03F 1/00 210/170.03 |
| 6,841,077 | B2 | * | 1/2005 | Gannon | B01D 15/00 210/170.03 |
| 6,869,525 | B1 | * | 3/2005 | Happel | E03F 1/00 210/163 |
| 6,908,548 | B1 | * | 6/2005 | Bruso | C02F 3/1242 210/259 |
| 7,005,060 | B2 | * | 2/2006 | Pitt | E03F 5/0404 210/170.03 |
| 7,025,076 | B2 | * | 4/2006 | Zimmerman, Jr. | E03B 1/04 405/36 |
| 7,025,887 | B1 | * | 4/2006 | Kirts | B01D 21/0039 210/170.03 |
| 7,041,213 | B1 | * | 5/2006 | McClanahan | E03F 5/18 210/170.03 |
| 7,083,721 | B2 | * | 8/2006 | McClure | E03F 1/00 210/162 |
| 7,160,465 | B2 | * | 1/2007 | Kirts | E03F 1/002 210/170.03 |
| 7,186,333 | B2 | * | 3/2007 | Kluge | E03F 1/00 210/691 |
| 7,387,467 | B2 | * | 6/2008 | Kelty | E03F 1/002 405/36 |
| 7,425,262 | B1 | * | 9/2008 | Kent | C02F 3/06 210/170.03 |
| 7,470,362 | B2 | * | 12/2008 | Kent | C02F 3/046 210/170.03 |
| 7,485,218 | B2 | * | 2/2009 | Dussich | E03F 1/00 210/255 |
| 7,503,725 | B1 | * | 3/2009 | Pratt | E03F 1/002 210/170.03 |
| 7,540,953 | B2 | * | 6/2009 | Fitzgerald | C02F 1/004 210/170.03 |
| 7,575,394 | B2 | * | 8/2009 | Shaw | E01C 11/229 404/75 |
| 7,645,390 | B1 | * | 1/2010 | McClanahan | E03F 5/18 210/744 |
| 7,651,293 | B2 | * | 1/2010 | Shaw | E01C 11/226 404/31 |
| 7,686,540 | B2 | * | 3/2010 | Urriola | E01C 11/228 405/53 |
| 7,686,956 | B1 | * | 3/2010 | Casebier | C02F 3/327 210/170.03 |
| 7,699,557 | B2 | * | 4/2010 | Shaw | E01C 11/229 405/50 |
| 7,758,747 | B2 | * | 7/2010 | Bryant | B01D 35/303 210/170.03 |
| 7,959,799 | B2 | * | 6/2011 | Happel | E03F 1/00 210/166 |
| 8,012,346 | B2 | * | 9/2011 | Peters, Jr. | E03F 1/00 210/170.03 |
| 8,137,564 | B2 | * | 3/2012 | Gannon | B01J 20/26 210/259 |
| 8,162,562 | B2 | * | 4/2012 | Sansalone | B01J 20/3085 404/82 |
| 8,162,563 | B2 | * | 4/2012 | Shaw | E01C 11/18 404/31 |

(56) References Cited

U.S. PATENT DOCUMENTS

| | | | | |
|---|---|---|---|---|
| 8,216,479 | B2* | 7/2012 | Lambert, V | E03F 1/002 |
| | | | | 210/170.03 |
| 8,323,485 | B2* | 12/2012 | Blundell | E03F 1/002 |
| | | | | 210/170.03 |
| 9,222,720 | B1* | 12/2015 | Alba | F24F 13/222 |
| 9,255,393 | B2* | 2/2016 | Trauth | E03B 1/00 |
| 10,138,625 | B2* | 11/2018 | Patton | C02F 3/327 |
| 10,899,633 | B1* | 1/2021 | Anguiano | B01D 39/04 |
| 11,332,383 | B1* | 5/2022 | Anguiano | E03F 1/002 |
| 11,346,094 | B2* | 5/2022 | Lee | B01D 35/1435 |
| 11,459,744 | B2* | 10/2022 | Swope | C02F 1/001 |
| 11,980,835 | B2* | 5/2024 | Zarraonandia | B01D 29/33 |
| 2001/0007309 | A1* | 7/2001 | Malone | E03F 1/002 |
| | | | | 210/170.03 |
| 2006/0102543 | A1* | 5/2006 | Peters | E03F 5/0404 |
| | | | | 210/170.03 |
| 2006/0207922 | A1* | 9/2006 | Dussich | E03F 5/0404 |
| | | | | 210/164 |
| 2006/0237369 | A1* | 10/2006 | Kirts | B01D 21/34 |
| | | | | 210/681 |
| 2007/0147960 | A1* | 6/2007 | Kelty | E03F 1/002 |
| | | | | 405/36 |
| 2007/0262009 | A1* | 11/2007 | Fitzgerald | E03F 5/0404 |
| | | | | 210/170.03 |
| 2008/0023383 | A1* | 1/2008 | Sansalone | B01J 20/06 |
| | | | | 210/170.03 |
| 2008/0047886 | A1* | 2/2008 | Lambert | E03F 1/002 |
| | | | | 210/170.03 |
| 2008/0152430 | A1* | 6/2008 | Flor | B01J 20/261 |
| | | | | 405/45 |
| 2009/0166278 | A1* | 7/2009 | Bryant | B01D 35/303 |
| | | | | 210/170.03 |
| 2012/0195686 | A1* | 8/2012 | Hardgrave | E03F 5/0404 |
| | | | | 405/52 |
| 2013/0180903 | A1* | 7/2013 | Kowalsky | E03F 5/0404 |
| | | | | 210/170.03 |
| 2017/0183242 | A1* | 6/2017 | Patton | C02F 1/44 |
| 2020/0009474 | A1* | 1/2020 | Pank | B01D 21/0012 |

OTHER PUBLICATIONS

Aquifer, Wikipedia, 11 pages (Year: 2025).*
Dry Well, Wikipedia, 3 pages (Year: 2025).*
PFAS Explained, EPA, 4 Pages (Year: 2025).*
PFAS, Wikipedia, 46 pages (Year: 2025).*
Madhvi Chittoor, TIME's Kids of the Year 2024 List (Year: 2024).*

* cited by examiner

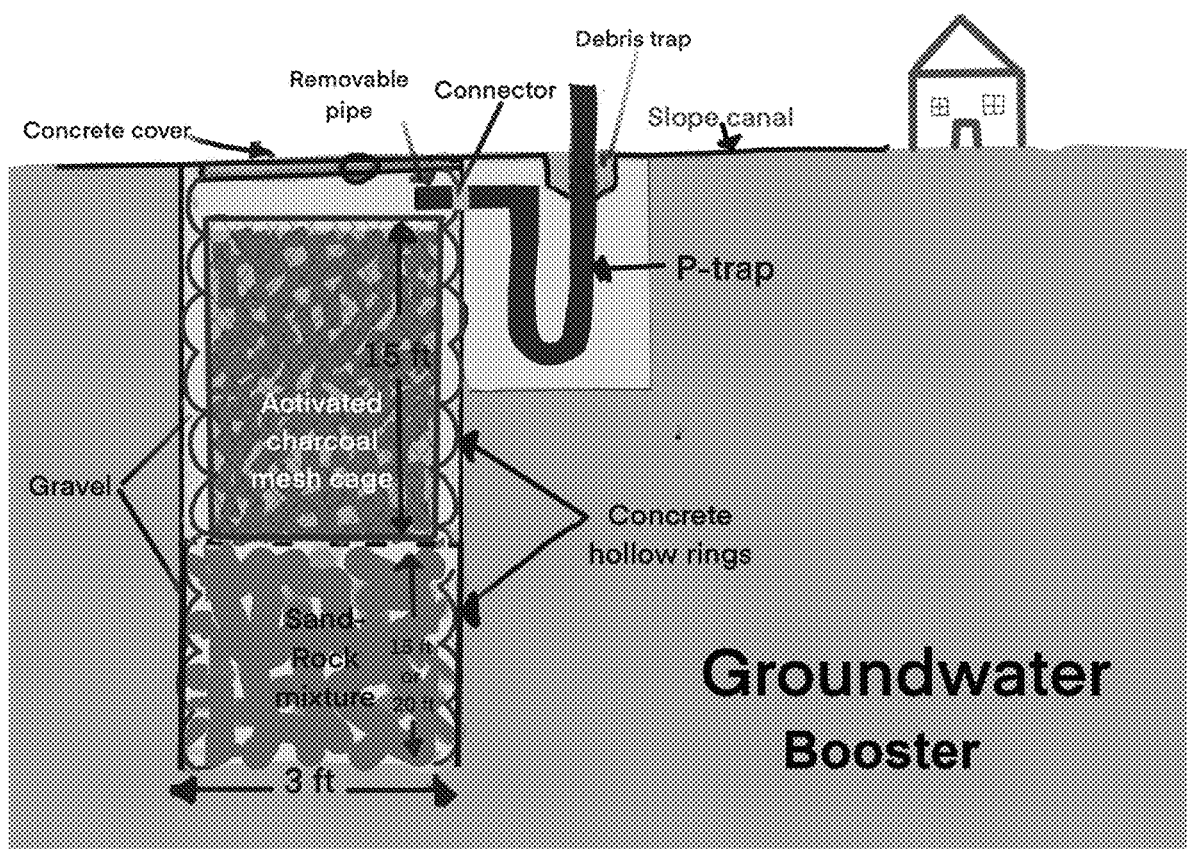

SYSTEM FOR PURIFYING AND DELIVERING SURFACE WATER TO AN AQUIFER

BACKGROUND

The system provides for the replenishment of aquifers with surface water resulting from rainfall or snowmelt. More specifically, the surface water is filtered to remove contaminants, such as, per- and polyfluoroalkyl substances, commonly referred to as PFAS, before being delivered to the aquifer. The disclosed Groundwater Booster System is built/constructed below the ground, and increases or "boosts" the groundwater level by supplying purified surface water to the aquifer.

Everywhere in the US and in the world, increasing temperatures are causing severe drought in the cities and rural areas. The rain and snow that is received is decreasing. Also, due to increases in population and construction of homes, more surface area is covered with concrete. This is more so, in business buildings like warehouses etc. So, whatever rain and snow is received, the resulting surface water run-off enters storm drains. Hence, the groundwater table is also rapidly decreasing.

BRIEF SUMMARY OF THE INVENTION

With my invention, I want to stop this from happening and I want to increase the groundwater table. The Groundwater Booster System will direct rainwater and snow-melt below the ground to increase the groundwater table. The Groundwater Booster System also aims to purify the rain-water and then direct it into the ground.

In August of 2022, scientists have proved that even rainwater contains PFAS, the dangerous chemical that is polluting our drinking water aquifers. Additionally, PFAS, disproportionately affects babies and children, as the PFAS concentration in the children's blood has been found to be up to 1000 times higher than that of the adults. As a result the brain, organ development and immunity system development is negatively impacted. Furthermore, wildlife drinks these contaminated waters. So, my invention aims to remove the PFAS from rainwater or snow-melt as much as possible.

Every home and business should install the Ground Water Booster System to help Planet Earth and therefore humanity themselves.

BRIEF DESCRIPTION OF THE DRAWING

The FIGURE depicts a sectional-view of the Ground Water Booster system.

DETAILED DESCRIPTION

A system for purifying and delivering surface water from rain or snow-melt to the local aquifer includes a debris trap having a concrete channel sloped towards the debris trap for directing surface water to the debris trap. A plurality of hollow, stacked, concrete structures are disposed within a hole in the ground, together, defining an open-topped, hollow volume. A bed of sand and gravel is disposed at a lowermost portion of the hollow volume. A removable mesh cage is disposed within the hollow volume and on top of the bed of sand and gravel, and has activated charcoal disposed therein. A connector member is fitted into a wall of the topmost hollow, concrete structure.

A P-trap including a vertically extending conduit portion that extends upwardly through a bottom of the debris trap, with a below-grade portion that extends above the bottom being perforated; and a horizontally extending conduit portion extending through, and connected to the wall of the topmost hollow, concrete structure with the connector member, for delivering surface water at a point within the hollow volume above the removable mesh cage. A removable cover is positioned over the hole.

Parts of the Groundwater-Booster apparatus:
1) A pit with a minimum depth of 35 ft to 40 ft and with a minimum width of 3 ft must be dug below the ground.
2) It can be in the shape of a cylinder with a circular mouth of diameter of 3 ft or a cuboid with a square mouth with a minimum width of 3 ft and a minimum length of 3 ft
3) Square or circular shaped rings that are hollow at the center are inserted into the pit and stacked one above the other.
4) The bottom of the pit is filled with sand and gravel for about 15 ft to 20 ft.
5) Then a galvanized hot dip steel mesh cage with a height of 15 ft is filled with activated charcoal.
6) It is then inserted into the rings.
7) A P-trap is setup as shown in the FIGURE.
8) A canal system is used to divert rainwater into the hollow on top of the activated charcoal mesh cage.
9) After about a year, the activated charcoal mesh cage can be removed and the activated charcoal can be industrially treated so as to reuse the activated charcoal.
10) When the water passes through the activated charcoal the impurities such as, PFAS, are removed.

The invention claimed is:
1. A system for purifying and delivering surface water from rain or snow-melt to the local aquifer comprising:
a debris trap;
a concrete channel sloped towards the debris trap for directing surface water to the debris trap;
a plurality of hollow, stacked, concrete structures are disposed within a hole in the ground, defining an open-topped, hollow volume;
a bed of sand and gravel is disposed at a lowermost portion of the hollow volume;
a removable mesh cage is disposed within the hollow volume and on top of the bed of sand and gravel;
activated charcoal is disposed within the removable mesh cage;
a connector member fitted into a wall of the topmost hollow, concrete structure;
a P-trap including:
a vertically extending conduit portion that extends upwardly through a bottom of the debris trap, with a below-grade portion that extends above the bottom being perforated;
a horizontally extending conduit portion extending through, and connected to the wall of the topmost hollow, concrete structure with the connector member, for delivering surface water at a point within the hollow volume above the removable mesh cage; and
a removable cover positioned over the hole.
2. The system for purifying and delivering surface water from rain or snow-melt to the local aquifer of claim 1, wherein the removable mesh cage comprises hot-dipped galvanized steel.

3. The system for purifying and delivering surface water from rain or snow-melt to the local aquifer of claim 1, wherein the plurality of hollow, concrete structures are cylindrically shaped.

4. The system for purifying and delivering surface water from rain or snow-melt to the local aquifer of claim 1, wherein the plurality of hollow, concrete structures are rectangularly shaped.

5. The system for purifying and delivering surface water from rain or snow-melt to the local aquifer of claim 1, wherein the plurality of hollow, concrete structures are square shaped.

6. The system for purifying and delivering surface water from rain or snow-melt to the local aquifer of claim 1, wherein the cover is made of concrete.

7. The system for purifying and delivering surface water from rain or snow-melt to the local aquifer of claim 1, wherein gravel is disposed in the annular space between an exterior surface of the plurality of stacked concrete structures and a wall of the hole.

8. The system for purifying and delivering surface water from rain or snow-melt to the local aquifer of claim 1, wherein the horizontally extending portion of the P-trap extending into the hollow volume is removable.

9. The system for purifying and delivering surface water from rain or snow-melt to the local aquifer of claim 1, wherein the hole is at approximately 35-40 feet deep.

10. The system for purifying and delivering surface water from rain or snow-melt to the local aquifer of claim 1, wherein the hole is at least 3 feet wide.

11. The system for purifying and delivering surface water from rain or snow-melt to the local aquifer of claim 1, wherein the removable mesh cage is approximately 15 feet in height.

12. The system for purifying and delivering surface water from rain or snow-melt to the local aquifer of claim 1, wherein the bed of sand and gravel is approximately 15-20 feet in depth.

* * * * *